(12) United States Patent
Eckart

(10) Patent No.: US 8,851,839 B2
(45) Date of Patent: Oct. 7, 2014

(54) WIDE BLADE MULTIPLE GENERATOR WIND TURBINE

(76) Inventor: Charles Franklin Eckart, Point Reyes Station, CA (US)

( * ) Notice: Subject to any disclaimer, the term of this patent is extended or adjusted under 35 U.S.C. 154(b) by 526 days.

(21) Appl. No.: 13/215,900

(22) Filed: Aug. 23, 2011

(65) Prior Publication Data

US 2013/0052013 A1 Feb. 28, 2013

(51) Int. Cl.
| | |
|---|---|
| *F03D 11/04* | (2006.01) |
| *F03D 7/02* | (2006.01) |
| *F03D 9/00* | (2006.01) |
| *F03D 11/02* | (2006.01) |
| *F03D 1/06* | (2006.01) |

(52) U.S. Cl.
CPC .............. *F03D 9/002* (2013.01); *F03D 7/0272* (2013.01); *F03D 11/02* (2013.01); *F03D 1/0633* (2013.01); *Y02E 10/721* (2013.01); *F05B 2270/32* (2013.01); *F03D 9/007* (2013.01); *Y02E 10/722* (2013.01); *Y02E 10/725* (2013.01); *Y02E 10/723* (2013.01); *F05B 2240/40* (2013.01)
USPC .......................................................... 416/9

(58) Field of Classification Search
CPC ...... Y02E 10/722; Y02E 10/725; F03D 11/02
USPC ................... 415/124.1; 416/9, 170 R
See application file for complete search history.

(56) References Cited

U.S. PATENT DOCUMENTS

| | | | |
|---|---|---|---|
| 4,039,848 A * | 8/1977 | Winderl ............................ 290/55 |
| 4,116,581 A * | 9/1978 | Bolie ............................... 415/4.4 |
| 4,585,950 A * | 4/1986 | Lund ................................ 290/44 |
| 5,347,769 A * | 9/1994 | Dinsmore ......................... 52/101 |
| 5,591,004 A * | 1/1997 | Aylor ............................... 416/42 |
| 5,642,687 A * | 7/1997 | Nylen et al. .................. 119/52.3 |
| 5,743,712 A * | 4/1998 | Aylor ............................... 416/42 |
| 6,098,348 A * | 8/2000 | Weaver ............................ 52/101 |
| 6,304,002 B1 * | 10/2001 | Dehlsen et al. ................ 290/1 C |
| 6,731,017 B2 * | 5/2004 | Mikhall et al. ................. 290/1 C |
| 6,872,049 B2 * | 3/2005 | Christensen ............... 415/124.1 |
| 6,921,243 B2 * | 7/2005 | Canini et al. ................... 415/4.3 |
| 6,951,443 B1 * | 10/2005 | Blakemore ..................... 415/4.3 |
| 7,011,598 B2 * | 3/2006 | Flamang et al. ............... 475/331 |
| 7,069,802 B2 * | 7/2006 | Mikhail et al. .................. 74/410 |
| 7,090,465 B2 * | 8/2006 | Flamang et al. ........... 416/170 R |
| 7,116,006 B2 * | 10/2006 | McCoin ........................... 290/54 |
| 7,323,792 B2 * | 1/2008 | Sohn ................................ 290/55 |
| 7,385,305 B2 * | 6/2008 | Casazza et al. .................. 290/55 |
| 7,816,800 B2 * | 10/2010 | Grenier ............................ 290/54 |
| 7,891,941 B2 * | 2/2011 | Bevington et al. ............. 415/123 |

(Continued)

*Primary Examiner* — Edward Look
*Assistant Examiner* — Eldon Brockman

(57) ABSTRACT

The present invention is a wide blade multiple generator wind turbine, which produces electrical energy by harnessing the kinetic energy of the wind to rotate multiple generators. Unlike traditional wind turbines, the present invention uses wide blades to focus on producing more torque rather than rotational speed. The wide blades are concentrically attached to a large drive wheel. The drive wheel is engaged to each of the generators and must be large enough to properly transfer the torque produced by the wide blades to the generators. The present invention could either position the generators concentrically around the drive wheel, which would directly engage the drive wheel to the generators, or position the generators laterally along the base structure, which would engage the drive wheel to the generators through a belt-and-pulley system or a chain-and-gear system. In addition to harnessing wind power, the present invention is design to absorb solar energy through the surface of the wide blades.

10 Claims, 17 Drawing Sheets

(56) References Cited

U.S. PATENT DOCUMENTS

| | | | |
|---|---|---|---|
| 7,935,020 B2* | 5/2011 | Jansen et al. | 475/338 |
| 8,021,121 B2* | 9/2011 | Mikkelsen et al. | 416/245 R |
| 8,033,951 B2* | 10/2011 | Pischel | 475/331 |
| 8,232,700 B2* | 7/2012 | Dooley | 310/114 |
| 8,235,861 B2* | 8/2012 | Lopez et al. | 475/331 |
| 8,274,170 B2* | 9/2012 | Kassner | 290/55 |
| 8,449,255 B2* | 5/2013 | Tadayon et al. | 416/37 |
| 8,502,403 B2* | 8/2013 | Merswolke et al. | 290/44 |
| 8,568,099 B2* | 10/2013 | Sabannavar et al. | 416/170 R |
| 2003/0230333 A1* | 12/2003 | Kashyap | 136/243 |
| 2004/0213671 A1* | 10/2004 | Flamang | 416/170 R |
| 2005/0269822 A1* | 12/2005 | Kinpara et al. | 290/40 C |
| 2006/0006658 A1* | 1/2006 | McCoin | 290/55 |
| 2008/0279686 A1* | 11/2008 | Demtroder | 416/61 |
| 2008/0315594 A1* | 12/2008 | Casazza et al. | 290/55 |
| 2009/0021021 A1* | 1/2009 | Grenier | 290/55 |
| 2009/0026771 A1* | 1/2009 | Bevington et al. | 290/55 |
| 2009/0045628 A1* | 2/2009 | Erdman et al. | 290/44 |
| 2009/0058094 A1* | 3/2009 | Jansen et al. | 290/55 |
| 2009/0289460 A1* | 11/2009 | Bech | 290/55 |
| 2011/0142649 A1* | 6/2011 | Ramanujam | 416/170 R |
| 2011/0175363 A1* | 7/2011 | Pischel | 290/55 |
| 2011/0206517 A1* | 8/2011 | Antonov et al. | 416/170 R |
| 2011/0243740 A1* | 10/2011 | Siegfriedsen | 416/170 R |
| 2012/0308386 A1* | 12/2012 | Piech et al. | 416/170 R |

* cited by examiner

WIDE BLADE MULTIPLE GENERATOR WIND TURBINE

FIELD OF THE INVENTION

The present invention relates generally to a wind turbine used to produce electrical power by simultaneously rotating multiple generators.

BACKGROUND OF THE INVENTION

Generating power sustainably and reliably from regenerative sources is one of the greatest challenges facing mankind in the upcoming post-oil years. It is expected that the world energy demand will continue to increase with population growth. The ability to generate clean reliable power is the key to world prosperity. Probably the most environmentally friendly means of generating power is by using the kinetic energy contained in the wind. Windmills can be constructed at both on-shore and off-shore sites that are known to have reliable winds. However, it is well known that one of the key problems facing windmills is that varying wind speeds seldom correlate with power demands from the grid side of this energy chain. Another problem is that because of their high rotational speed, windmills have killed many thousands of birds. Because of this, public resistance to windmills has increased. The present invention is a large windmill that can dramatically increase electrical production by having the ability to turn many more electrical generators on a single installation than the present day single-generator windmills. Depending on the power needs of the grid, the present invention would be able to turn any number of generators.

DETAIL DESCRIPTIONS OF THE INVENTION

All illustrations of the drawings are for the purpose of describing selected versions of the present invention and are not intended to limit the scope of the present invention.

Figure 1:
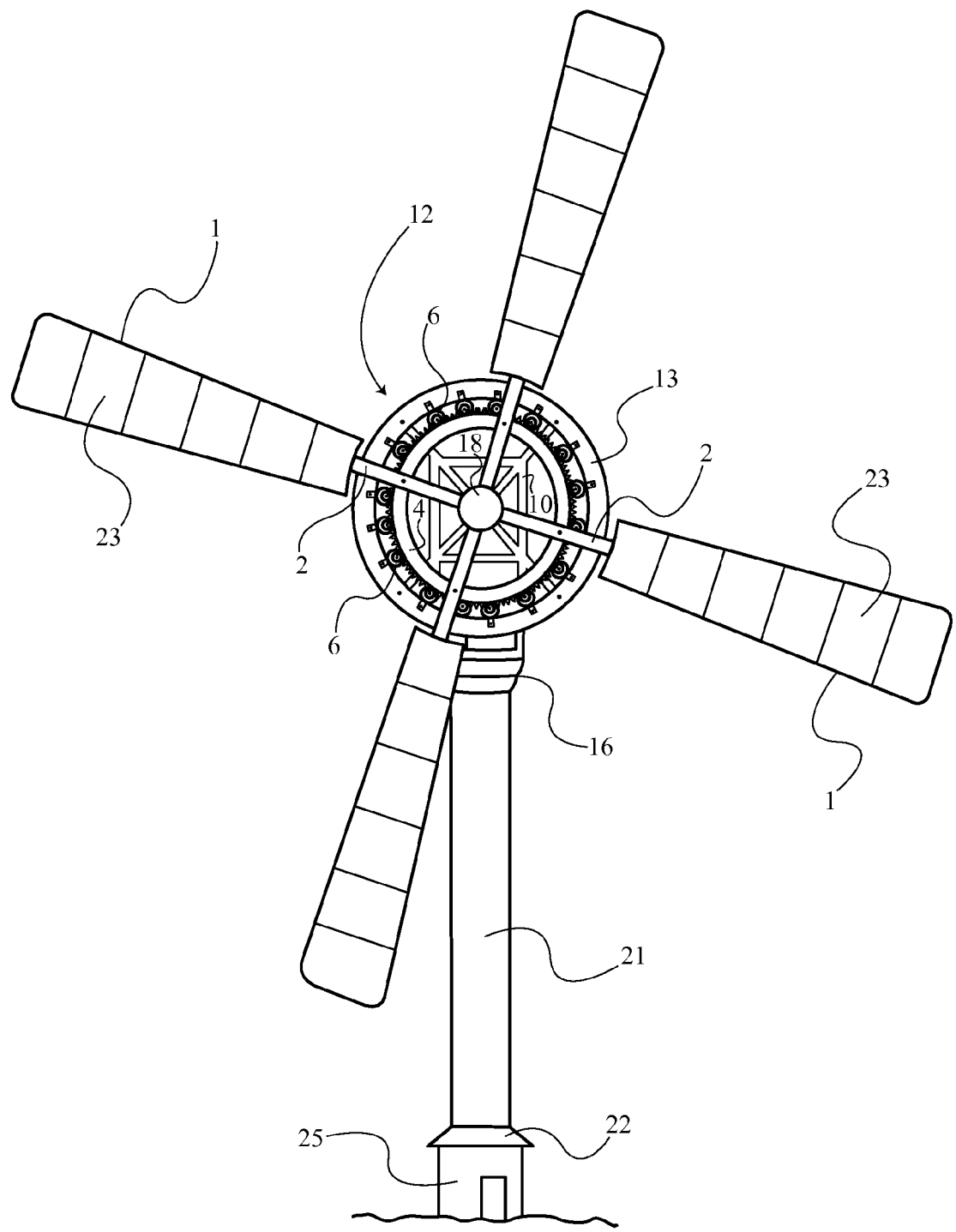
FIG. 1 is a front view of the present invention's first embodiment.
Figure 2:
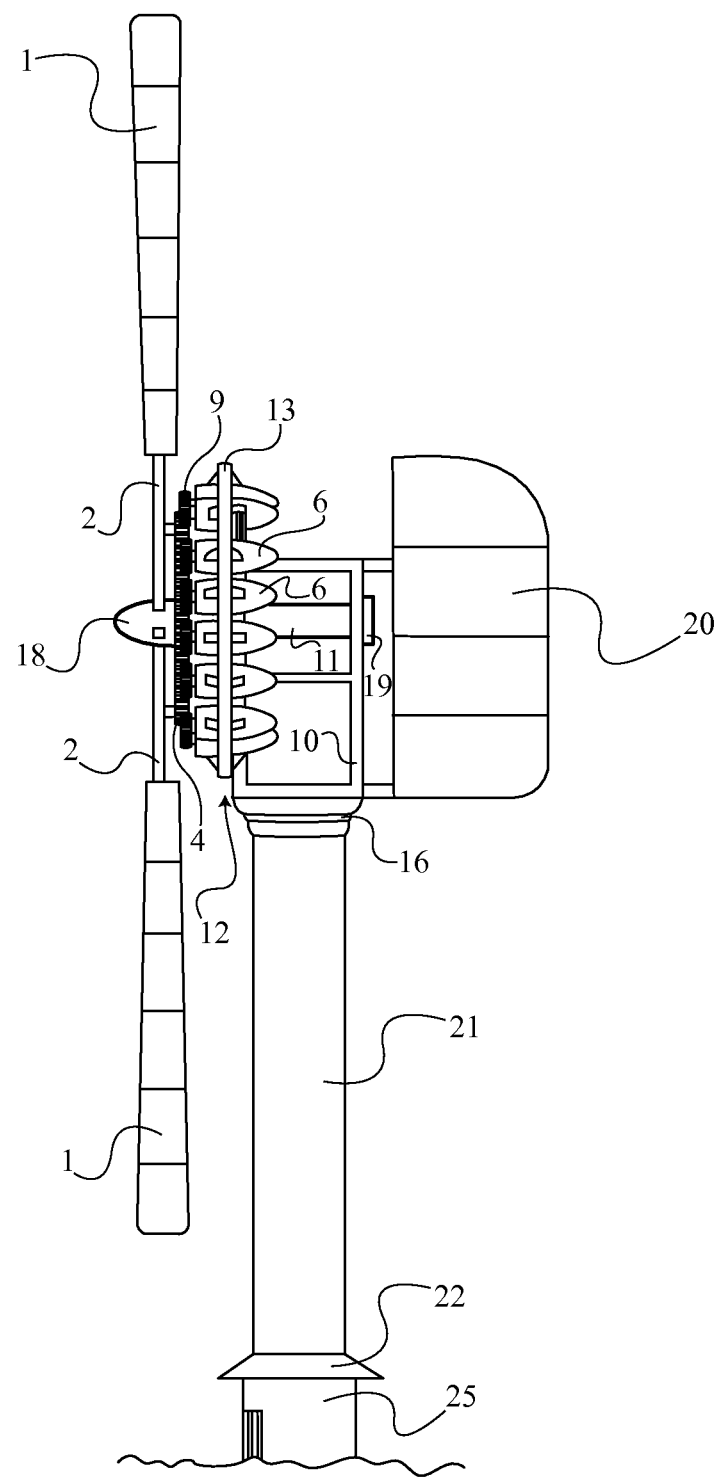
FIG. 2 is a side view of the present invention's first embodiment, where the generator support system utilizes only one circular armature.
Figure 17:
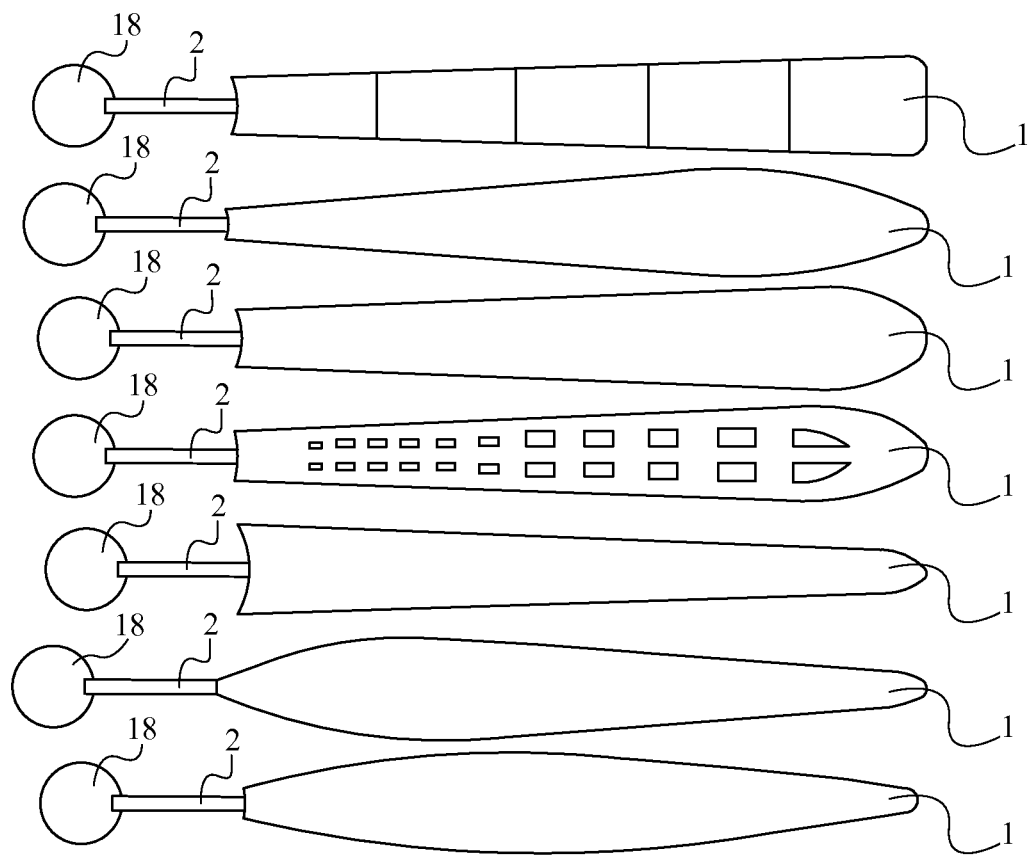
FIG. 17 illustrates the different kinds of wide blades that can be utilized by the present invention.

The present invention is a wide blade multiple generator wind turbine, which produces electrical power by rotating multiple generators, as can be seen in FIGS. 1 and 2. The wide blade multiple generator wind turbine comprises a plurality of wide blades 1, a plurality of blade arms 2, a torque transferring mechanism 3, a plurality of generators 6, a support structure 10, a yaw rotation mechanism 16, a main shaft 17, a wind alignment mechanism 20, a base structure 21, a squirrel deflector 22, a plurality of solar energy capturing surfaces 23, a shroud 24, and a tech room 25. The present invention is designed much like a windmill, which places a greater emphasis on producing more torque instead of angular velocity. The plurality of wide blades 1 allows the present invention to change the kinetic energy of the wind into angular kinetic energy. The blades found on a single generator wind turbine are narrow because their blades are designed to rotate at a faster angular velocity as they capture high-velocity wind. This plurality of wide blades 1 is designed to rotate at a slower angular velocity, which allows the present invention to produce more torque. The plurality of wide blades 1 could be constructed in a variety of designs shown in FIG. 17.

Figure 4:
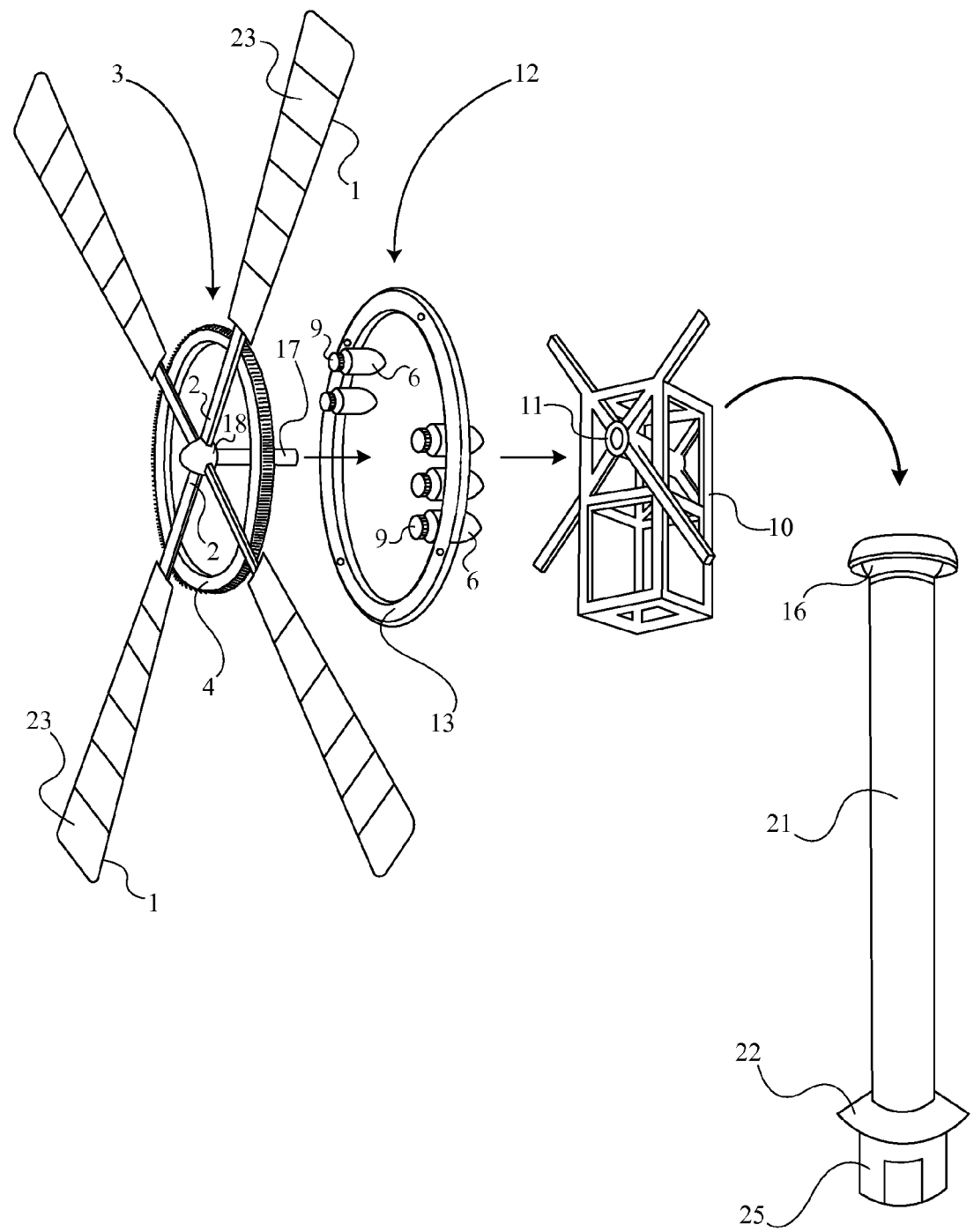
FIG. 4 is an exploded view of the components of the present invention's first embodiment.

In FIG. 4, the main shaft 17 is shown as an axle that allows the plurality of wide blades 1 to rotate around a center axis. The main shaft 17 has a front stop 18 located on one end and a rear stop 19 located on the other end to keep the main shaft 17 in place. The plurality of blade arms 2 radially attaches each of the plurality of wide blades 1 to the front stop 18. The torque transferring mechanism 3 is concentrically positioned around the main shaft 17 and conveys the torque produced by the plurality of wide blades 1 to the plurality of generators 6. In the first embodiment of the present invention, the torque transferring mechanism 3 comprises a sun gear 4. The sun gear 4 is attached to the plurality of the blade arms 2, which relieves stress to the front stop 18 and allows the sun gear 4 to rotate at the same angular velocity as the main shaft 17. The plurality of the wide blades 1 must clear the plurality of generators 6 to allow enough clearance for pitch control. The plurality of blade arms 2 serves a dual purpose: First, the plurality of blade arms 2 attaches the plurality of wide blades 1 to the main shaft 17. Second, the plurality of blade arms 2 distances the plurality of wide blades 1 far enough from the main shaft 17 to allow their attachment to the sun gear and to allow their clearance from the plurality of generators 6 for pitch control.

The support structure 10 holds the main shaft 17 at the top of the present invention so that the plurality of wide blades 1 is properly situated above the ground. The support structure 10 consists of a hollow cylinder 11, which encircles the lateral surface of the main shaft 17. The support structure 10 also consists of a generator support system 12, which allows the present invention to hold the plurality of generators 6 in the proper position. In the first embodiment of the present invention, the generator support system 12 is a circular armature 13. The circular armature 13 is positioned concentrically around the hollow cylinder 11 and is attached to the support structure 10. The circular armature 13 properly positions the plurality of generators 6 around the sun gear 4, which must be large enough to simultaneously engage each of the plurality of generators 6. The bracket 7 of each of the plurality of generators 6 physically attaches each of the plurality of generators 6 to the circular armature 13.

Figure 5:
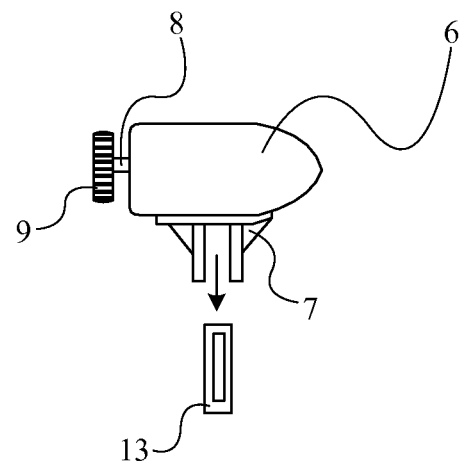
FIG. 5 is a side view of a generator being attached to the circular armature with a bracket.
Figure 6:
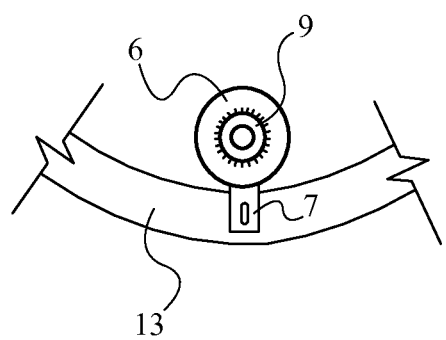
FIG. 6 is a front view of a generator attached to the circular armature with a bracket.

The plurality of generators 6 is the device that converts the angular kinetic energy captured by the plurality of wide blades 1 into electrical energy. In the first embodiment of the present invention, the plurality of generators 6 each consists of a bracket 7, a coupling device 8, and a planet gear 9, which are shown in FIGS. 5 and 6. The planet gear 9 for each of the plurality of generators 6 is engaged to the sun gear 4. The gear ratio between the planet gear 9 and the sun gear 4 is relatively large because the diameter of the planet gear 9 is relatively much smaller than the diameter of the sun gear 4, which allows each of the plurality of generators 6 to be simultaneously engaged to the sun gear 4 and to turn at a greater angular velocity than the sun gear 4 for electrical generation. The coupling device 8 for each of the plurality of generators 6 is used to connect each of the plurality of generators 6 to its planet gear 9. The coupling device 8 allows each of the plurality of generators 6 to engage or disengage from their planet gear 9 depending on the available kinetic energy of the wind. For example, the coupling device 8 could be a centrifugal clutch connecting the planet gear 9 to a generator so that the planet gear 9 would only engage the generator once the plurality of wide blades 1 accumulated enough angular momentum. Another example of a coupling device 8 could be an electronic control unit implementing a set of control strategies that determine which of the plurality of generators 6 should be run in closed circuit and which of the plurality of generators 6 should be run in open circuit. The set of control strategies focuses on maintaining a constant angular velocity in between an omega low threshold and an omega high threshold for the plurality of wide blades 1. To keep the angular velocity of the plurality of wide blades 1 in between the omega low threshold and the omega high threshold, the set of control strategies would determine to increase the number of generators running in open circuit in order to increase the angular velocity of the plurality of wide blades 1 and would determine to decrease the number of generators running in open circuit in order to decrease the angular velocity of the plurality of wide blades 1.

Figure 19:
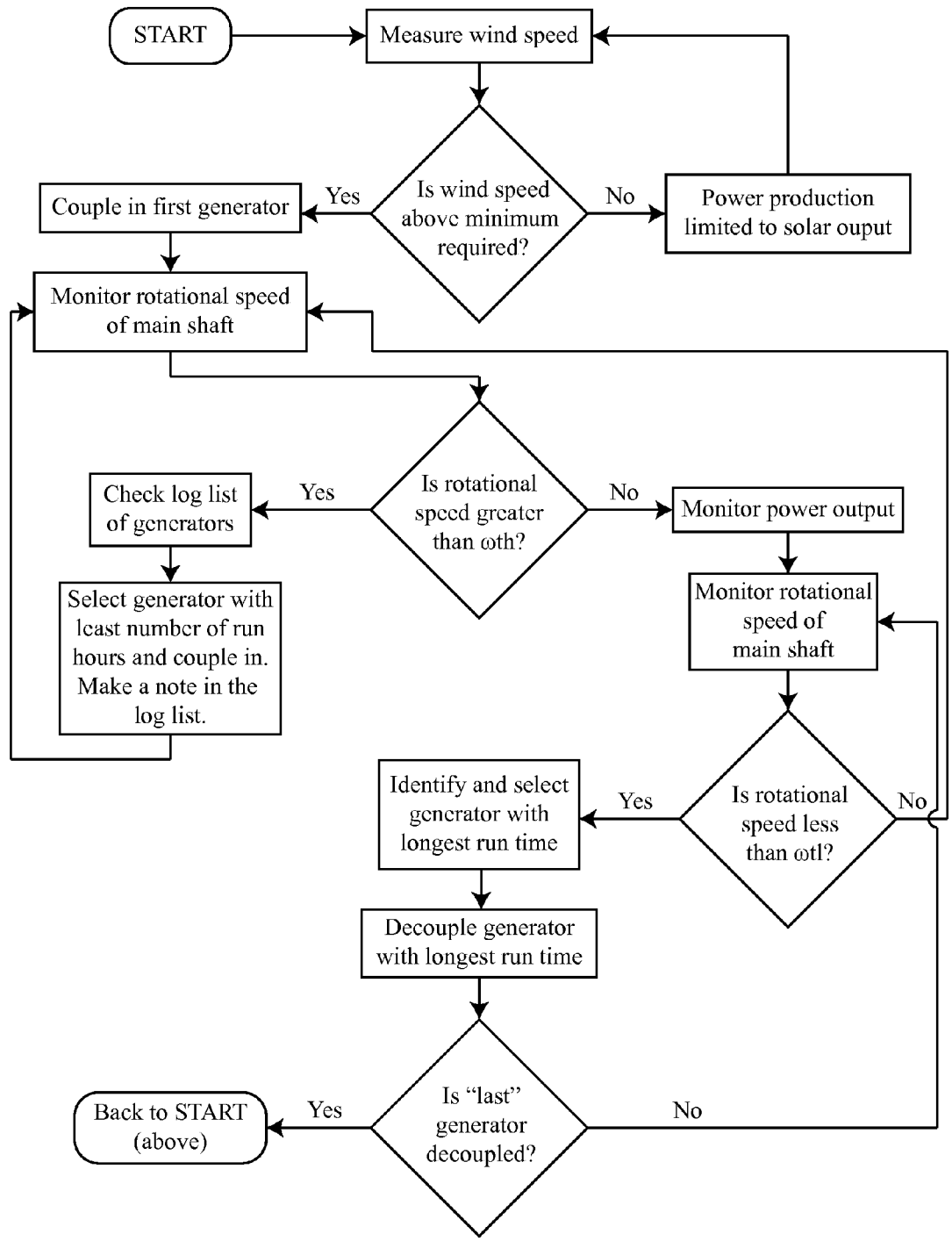
FIG. 19 illustrates the method of maintaining a constant angular velocity in between an omega low threshold ($\omega lt$) and an omega high threshold ($\omega ht$).

The set of control strategies is used by the electronic control unit to maintain a constant angular velocity for the plurality of wide blades 1 by not only deciding how many generators to run in open circuit but also by wind speed measurements, power output, and the generator loads. FIG. 19 illustrates the set of control strategies in a flow chart. The first step in the set of control strategies is to measure the wind speed and determine whether the wind speed is above the required minimum. If the wind speed is above the required minimum, then the electronic control unit will couple in the first generator into the power grid by running the first generator in closed circuit. If the wind speed is below the required minimum, then the electronic control unit will continue to measure the wind speed until the wind speed is above the required minimum. The second step in the set of the control strategies is to measure the angular velocity of the plurality of wide blades 1 and determine whether the angular velocity of the plurality of wide blades 1 is greater than the omega high threshold. If the angular velocity of plurality of wide blades 1 is greater than the omega high threshold, then the electronic control unit will check which of the plurality of generators 6 has the least run hours, will couple in that generator into the power grid, and will repeat the second step for the set of control strategies. If the angular velocity of the plurality of wide blades 1 is not greater than the omega high threshold, then the electronic control unit will monitor the power output of the plurality of generators 6. The third step in the set of control strategies is to measure the angular velocity of the plurality of wide blades 1 and determine whether the angular velocity of the plurality of wide blades 1 is less than the omega low threshold. If the angular velocity of the plurality of wide blades 1 is less than the omega low threshold, then the electronic control unit will determine which of the plurality of generators 6 has the most run hours and will decouple that generator from the power grid by running that generator in open circuit. If the angular velocity of the plurality of the wide blades 1 is not less than the omega low threshold, then the electronic control unit will repeat the second step for the set of control strategies. The fourth step in the set of control strategies is to determine whether the last of the plurality of the generators is decoupled from the present invention's power grid. If the last of the plurality of generators 6 is decoupled, then the electronic control unit will repeat the first step in the set of control strategies. If the last of the plurality of generators 6 is not decoupled, then the electronic control unit will repeat the third step for the set of control strategies.

Figure 18:
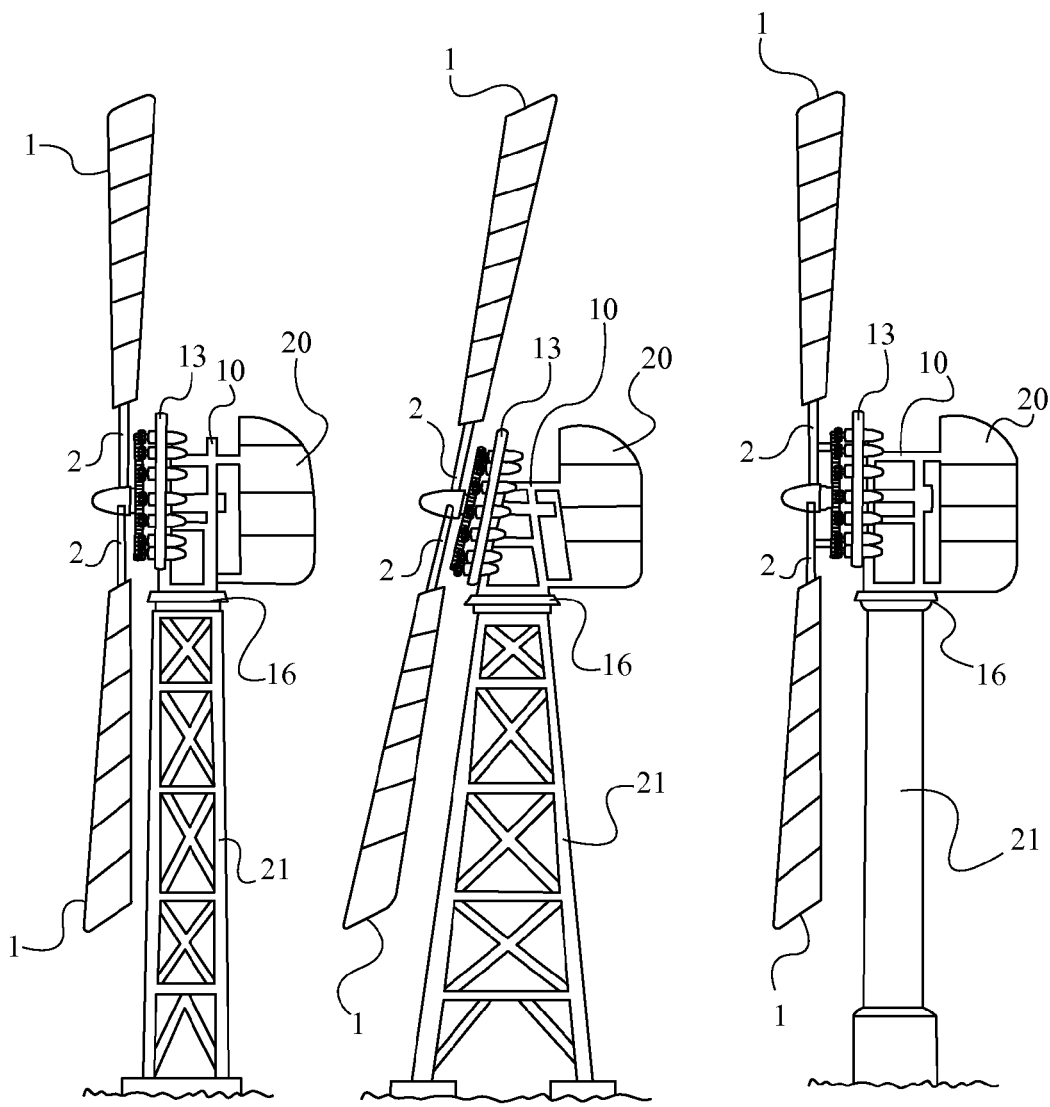
FIG. 18 illustrates the different kinds of base structures that can be utilized by the present invention.

The base structure 21 is the foundation of the present invention and positions the plurality of wide blades 1 at an appropriate distance above the ground. The base structure 21 also serves as a hub for all other components of the present invention to be connected together. The base structure 21 should ideally be a large cylindrical column, but a promising alternative could be the base structure 21 in the form of a truss structure shown in FIG. 18, which should be more capable of supporting the large weight load from the plurality of generators 6. In the first embodiment of the present invention, the yaw rotation mechanism 16 consists of a pivotal bearing and connects the bottom of the support structure 10 to the top of the base structure 21. The pivotal bearing allows the support structure 10 to rotate a full 360 degrees while the base structure 21 is situated firmly in the ground. The yaw rotation mechanism 16 allows the plurality of wide blades 1 to rotate a full 360 degrees so that the plurality of wide blades 1 can turn into the direction of the oncoming wind and capture the maximum amount of kinetic energy from the wind. The wind alignment mechanism 20 determines the direction of the wind for the present invention and provides the force to turn the plurality of wide blades 1 into the direction of the oncoming wind. The wind alignment mechanism 20 can either be just a rudder or an electric motor and an electronic device. If the wind alignment mechanism 20 is a rudder, then the wind alignment mechanism 20 is attached to the back of the support structure 10. The wind would apply a force on the rudder if the plurality of wide blades 1 was not facing the direction of the wind. The force applied on the rudder would rotate the support structure 10 on the pivotal bearing, until the plurality of wide blades 1 did face the direction of the oncoming wind. If the wind alignment mechanism 20 is an electric motor and an electronic device, then the stator of the electric motor is attached to the base structure 21, the rotor of the electric motor is attached to the support structure 10, and the electronic device is attached on top of the support structure 10. The electronic device is used to determine the direction of the wind, and the electric motor rotates the support structure 10 until the plurality of wide blades 1 faces into the direction of the wind.

Figure 14:
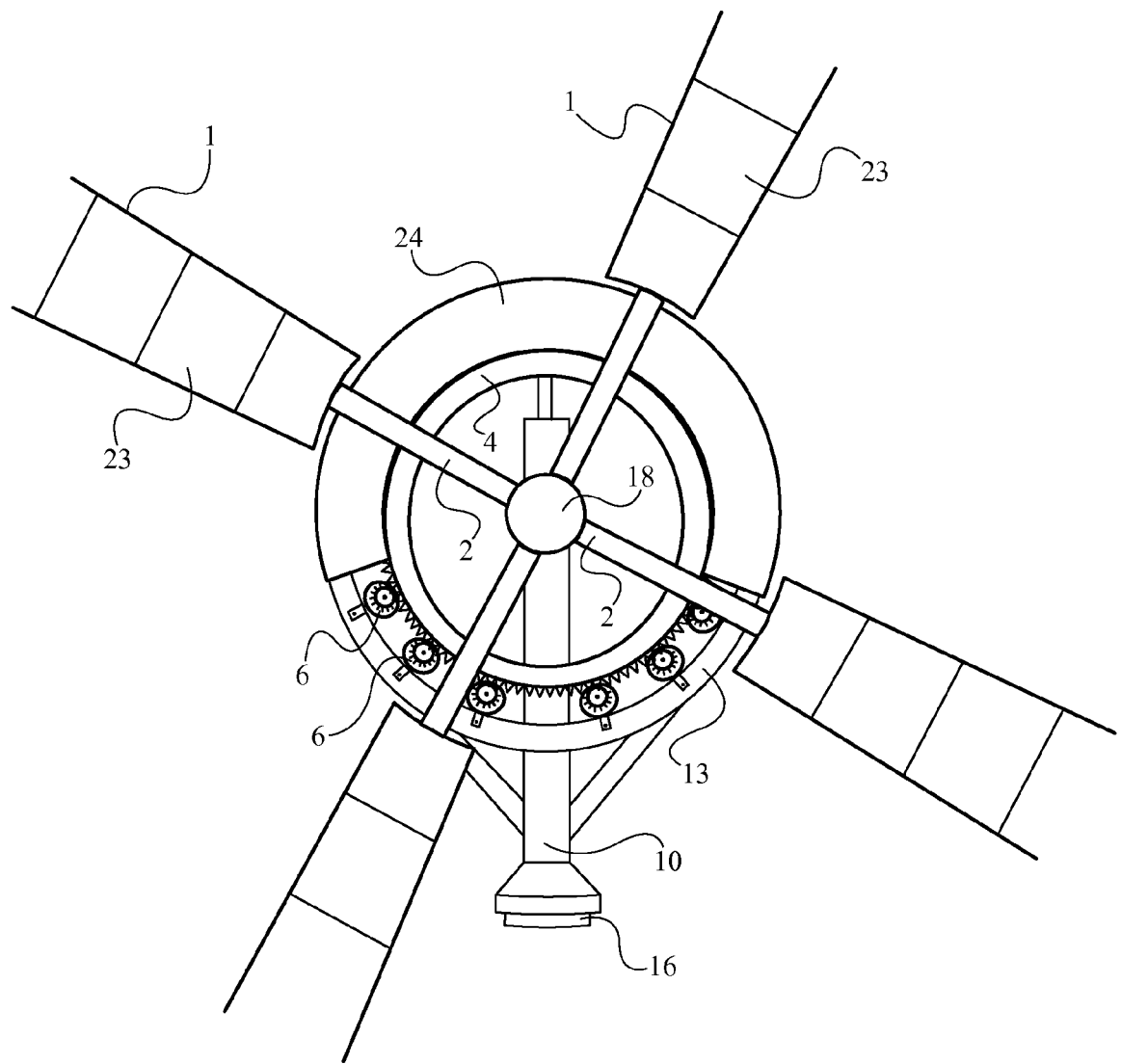
FIG. 14 is a front view of the present invention's first embodiment illustrating how the shroud covers the plurality of generators.
Figure 15:
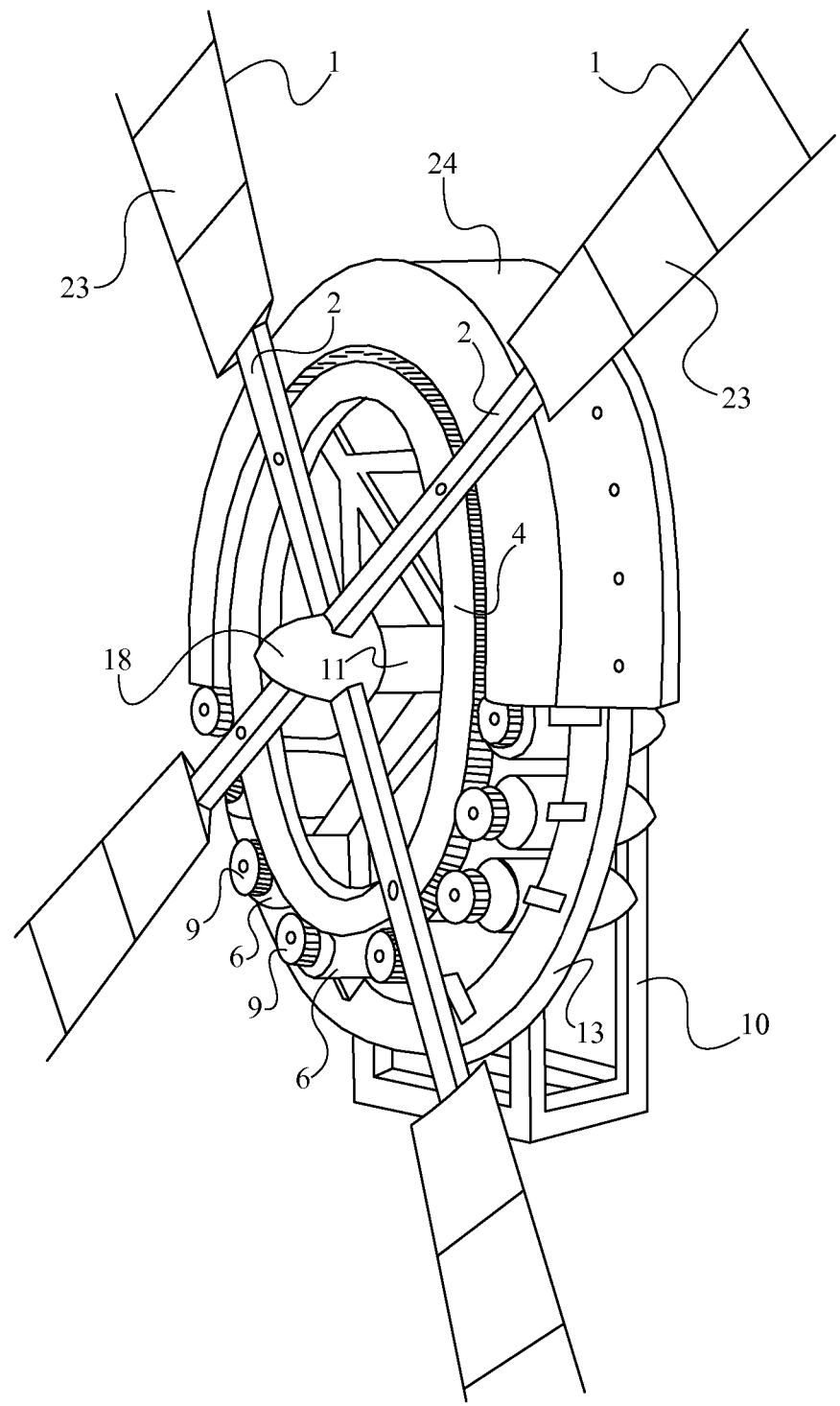
FIG. 15 is a perspective view of the present invention's first embodiment, where the generator support system utilizes only one circular armature, and highlights how the shroud covers the plurality of generators.

The components that are not involved in harnessing the kinetic energy of the wind include the squirrel deflector 22, the plurality of solar energy capturing surfaces 23, the shroud 24, and the tech room 25. The squirrel deflector 22 is an annular protrusion connected to the lateral surface of the base structure 21 and prevents squirrels and other animals from climbing up the base structure 21. The plurality of solar energy capturing surfaces 23 is primarily located on the plurality of wide blades 1. The plurality of solar energy capturing surfaces 23 can also be placed on the wind alignment mechanism 20 if the wind alignment mechanism 20 is a rudder. The energy produced from the plurality of solar energy capturing surfaces 23 is relatively small in comparison to the kinetic energy captured by the plurality of wide blades 1, but the plurality of solar energy capturing surfaces 23 could provide enough energy to maintain the operation of the present invention while all of the electrical energy produced by the plurality of generators 6 is sent directly to the power grid. The plurality of solar energy capturing surfaces 23 can either be a plurality of solar panels or a solar energy absorbing paint. If the plurality of solar energy capturing surfaces 23 consists of a plurality of solar panels, then the plurality of wide blades 1 could be made of solar panels, which would create the plurality of solar energy capturing surfaces 23 on the plurality of wide blades 1. If the plurality of solar energy capturing surfaces 23 consists of a solar energy absorbing paint, then the solar energy absorbing paint should be applied to the surface of the plurality of wide blades 1, which would create the plurality of solar energy capturing surfaces 23 on the plurality of wide blades 1. The solar energy absorbing paint is better suited to create the plurality of solar energy capturing surfaces 23 because the plurality of solar panels would be heavier than a coat of solar energy absorbing paint and would reduce the ability of the plurality of wide blades 1 to capture the maximum amount of kinetic energy from the wind. The shroud 24, shown in FIGS. 14 and 15, is a cover placed over the plurality of generators 6 to keep the sun gear 4 and the planet gear 9 of each of the plurality of generators 6 clean. The shroud 24 is attached to the generator support system 12. In addition to the shroud 24, an automatic cleaning device would remove objects jamming the sun gear 4 and the planet gear 9 of each of plurality of generators 6. The tech room 25 is positioned within the base structure 21 and allows maintenance personnel to monitor a variety of aspects concerning the present invention.

Figure 3:
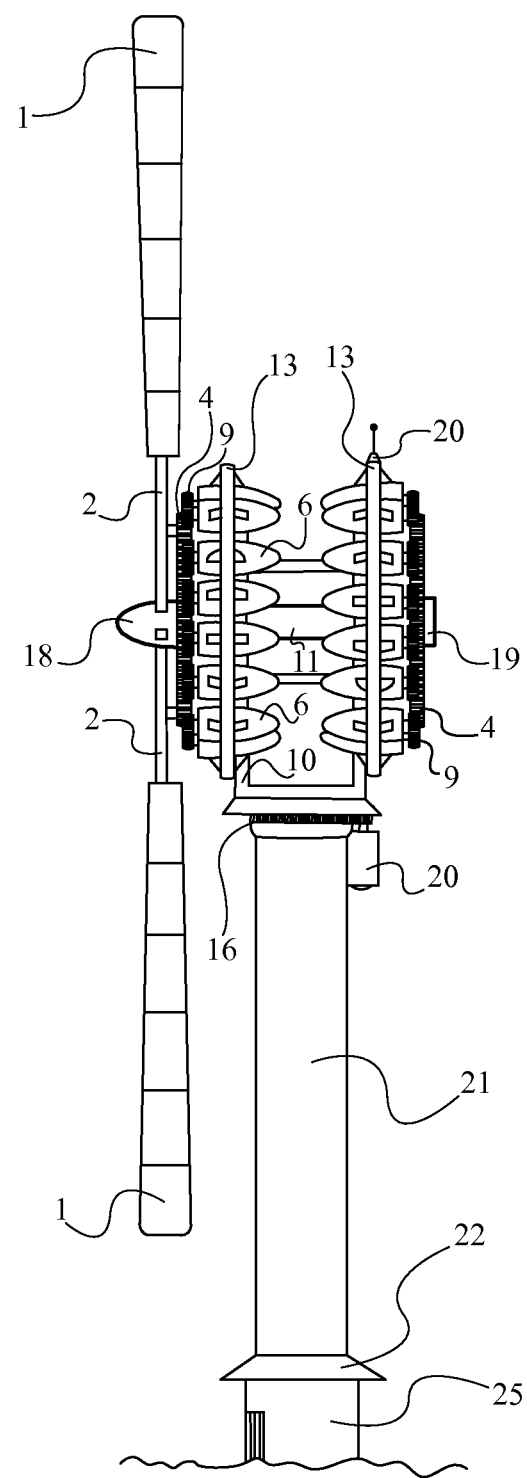
FIG. 3 is a side view of the present invention's second embodiment, where the generator support system utilizes two circular armatures.
Figure 16:
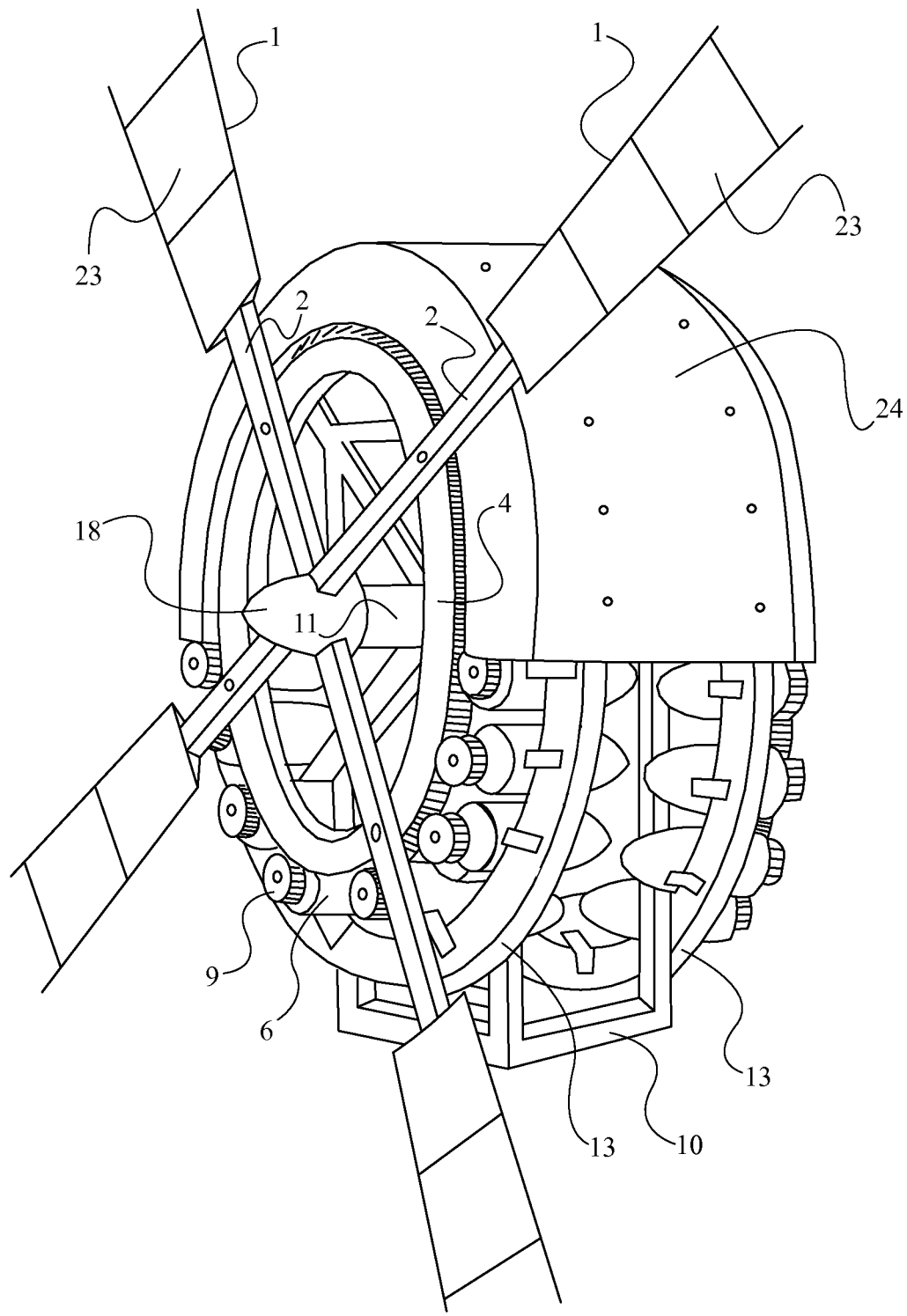
FIG. 16 is a perspective view of the present invention's first embodiment, where the generator support system utilizes two circular armatures, and highlights how the shroud covers the plurality of generators.

In another embodiment similar to the first embodiment, the present invention is designed to cater to a location where the strength of the wind produces more torque with the plurality of wide blades 1 than can be used by the plurality of generators 6 on one circular armature 13. FIGS. 3 and 16 illustrate this embodiment. In this embodiment, the torque transferring mechanism 3 consists of two sun gears 4, and the generator support system 12 consists of two circular armatures 13. One of the sun gears 4 is concentrically connected around the main shaft 17 to the plurality of blade arms 2, and the other sun gear 4 is concentrically connected around the main shaft 17 with a plurality of spokes adjacent to the back stop 19. Likewise, one of the circular armatures 13 is attached to the front of the support structure 10, and the other circular armature 13 is attached to the back of the support structure 10. Both of the circular armatures 13 are concentrically positioned around the hollow cylinder 11. The present invention can accommodate a larger plurality of generators 6 with the arrangement of the torque transferring mechanism 3 and the generator support system 12 being doubled in this embodiment. Also in this embodiment, the wind alignment mechanism 20 can only be the electric motor and the electronic device because the other circular armature 13 is attached to the back of the support structure 10, where the rudder is supposed to be attached.

Figure 7:
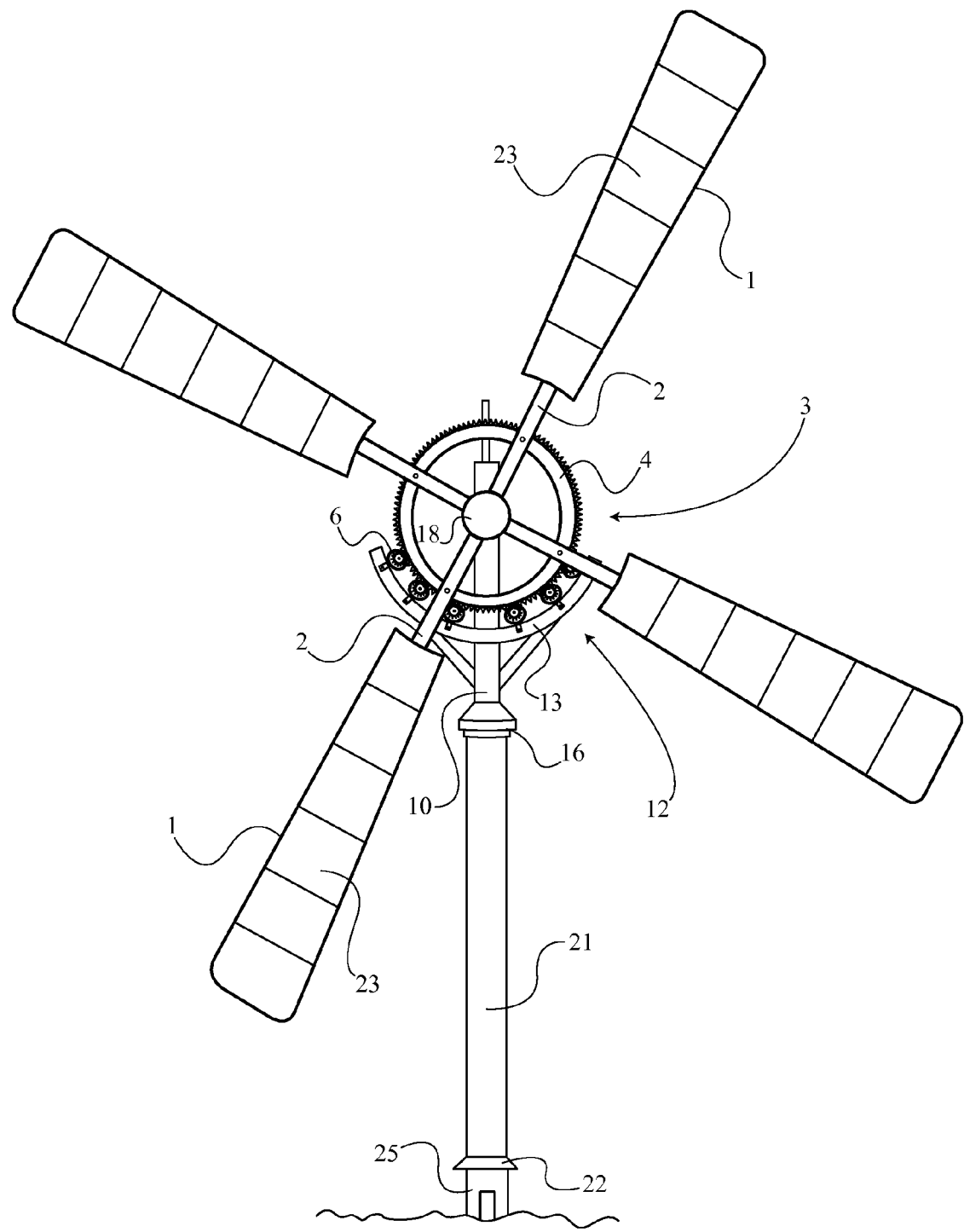
FIG. 7 is a front view of the present invention's first embodiment, where the generator support system utilizes a fraction of a circular armature.
Figure 8:
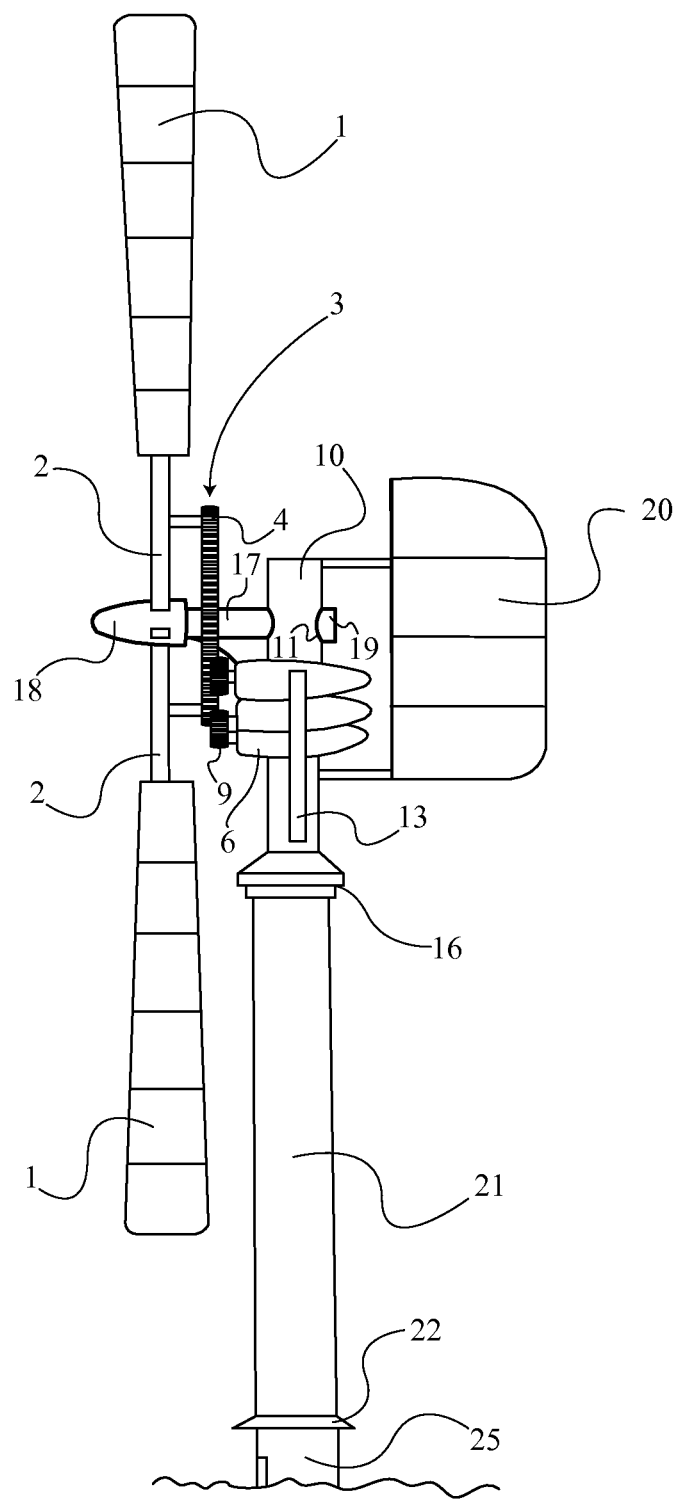
FIG. 8 is a side view of the present invention's first embodiment, where the generator support system utilizes a fraction of a circular armature.

In another embodiment similar to the first embodiment, the present invention is designed to cater to a location where the strength of the wind produces less torque with the plurality of wide blades 1 than is necessary for the plurality of generators 6 on one circular armature 13. This embodiment is illustrated by FIGS. 7 and 8. In this embodiment, the generator support system 12 consists of a fraction of the circular armature 13. The fraction of the circular armature 13 is still attached to the support structure 10 and is concentric with the hollow cylinder 11. The fraction of the circular armature 13 allows the present invention to accommodate a smaller plurality of generators 6.

Figure 10:
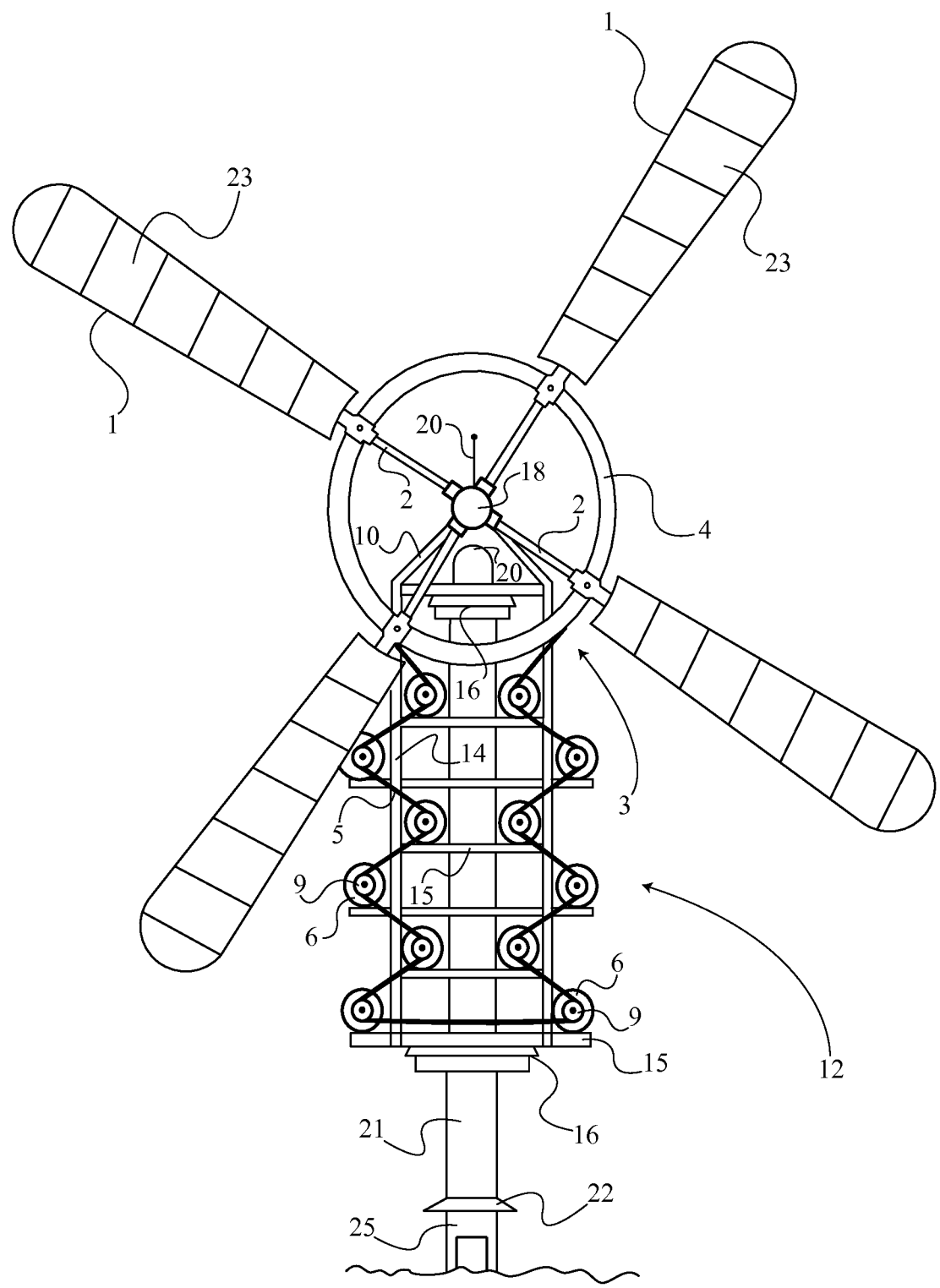
FIG. 10 is a front view of the present invention's second embodiment, where the present invention utilizes a yaw rotational mechanism.
Figure 11:
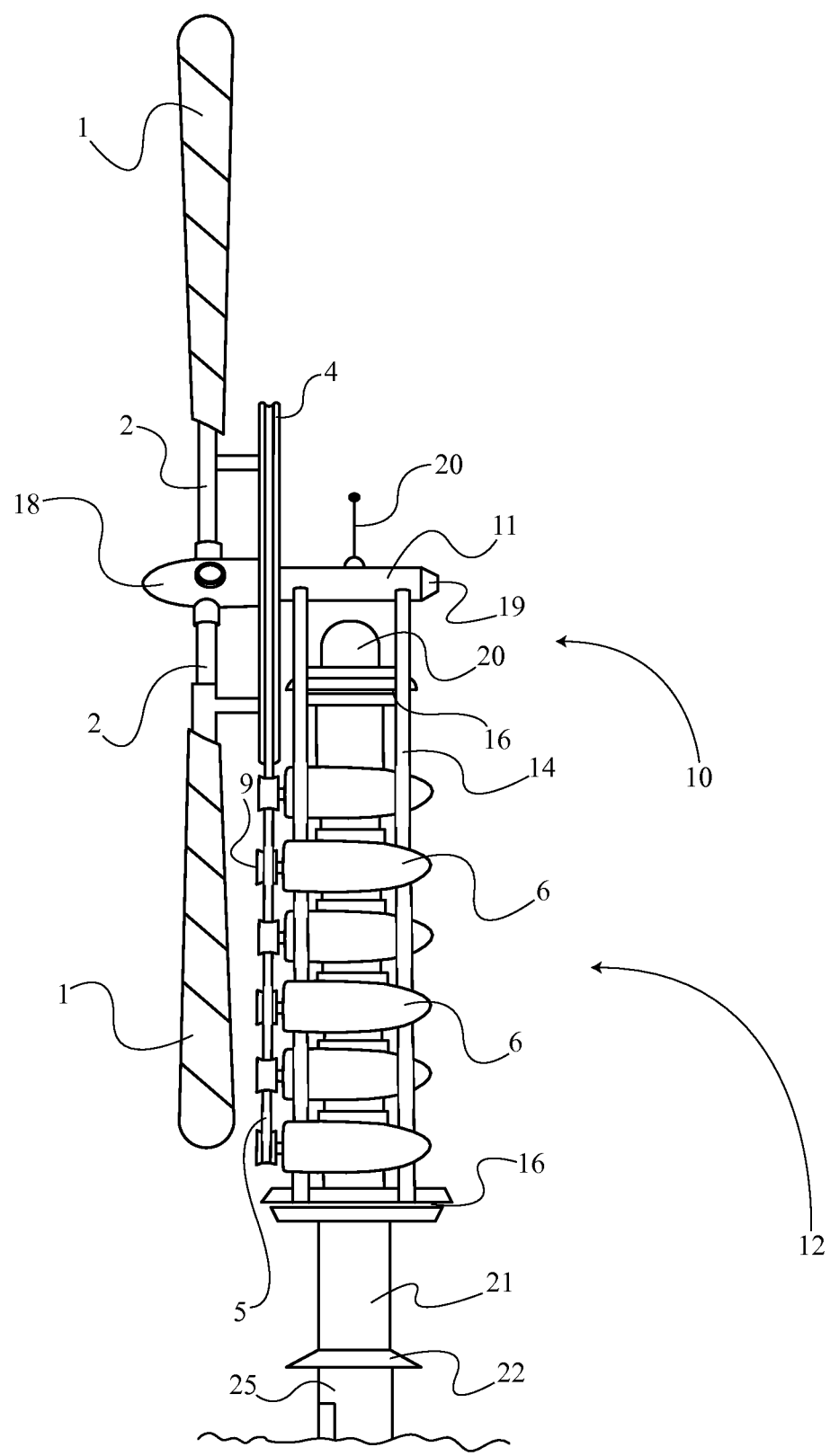
FIG. 11 is a side view of the present invention's second embodiment, where the present invention utilizes a yaw rotational mechanism.
Figure 12:
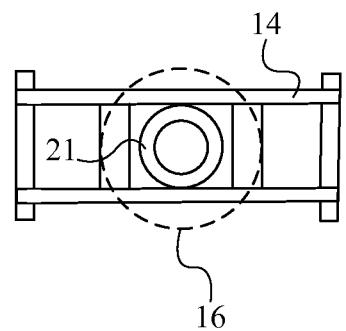
FIG. 12 is a top view of the top pivotal bearing used in the yaw rotational mechanism.
Figure 13:
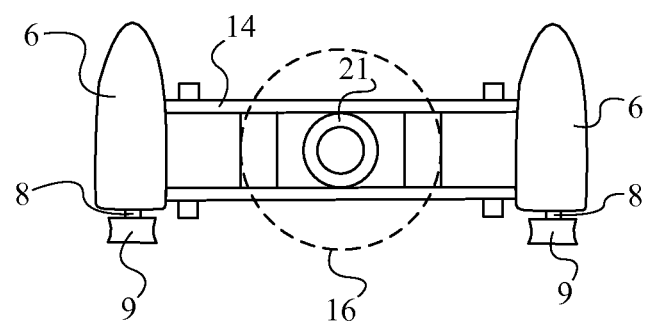
FIG. 13 is a top view of the bottom pivotal bearing used in the yaw rotational mechanism.

In the second embodiment of the present invention, the primary difference is the positioning of the plurality of generators 6. In the second embodiment, which is shown in FIGS. 10 and 11, the plurality of generators 6 is positioned adjacent to the lateral surface of the base structure 21, instead of the circular manner described in the first embodiment. The generator support system 12 now consists of a cage 14 instead of a circular armature 13. The cage 14 is a series of beams connected together and has a plurality of platforms 15 positioned throughout the series of beams. The cage 14 is positioned so that the base structure 21 traverses through the cage 14. The cage 14 is attached the base structure 21 with the yaw rotation mechanism 16, which consists of a top pivotal bearing and a bottom pivotal bearing in the second embodiment. As can be seen in FIGS. 12 and 13, the top pivotal bearing attaches the top of the cage 14 to the base structure 21, and the bottom pivotal bearing attaches the bottom of the cage 14 to the base structure 21. Also in the second embodiment of the present invention, the rest of the support structure 10 is attached atop the cage 14, which allows the plurality of wide blades 1 to turn into the oncoming wind. The hollow cylinder 11 is positioned at the top of the support structure 10 instead of the center of the support structure 10. The plurality of generators 6 is placed on and attached to the plurality of platforms 15. In the second embodiment, the torque transferring mechanism 3 consists of a chain 5 in addition to the sun gear 4 because the plurality of generators 6 is not positioned around the main shaft 17. The chain 5 will engage both the sun gear 4 and the planet gear 9 of each of the plurality of generators 6, which is positioned along the lateral surface of the base structure 21. In the second embodiment of the present invention, the sun gear 4, the chain 5, and the planet gear 9 for each of the plurality of generators 6 could instead be a large pulley, a belt, and a smaller pulley for each of the plurality of generators 6. The wind alignment mechanism 20 can only consist of an electric motor and an electronic device because attaching a rudder to the back of either the support structure 10 or the cage 14 would be difficult. The stator of the electric motor is attached to the base structure 21, and the rotor of the electric motor is attached to the cage 14. The electronic device would still be attached atop the support structure 10.

Figure 9:
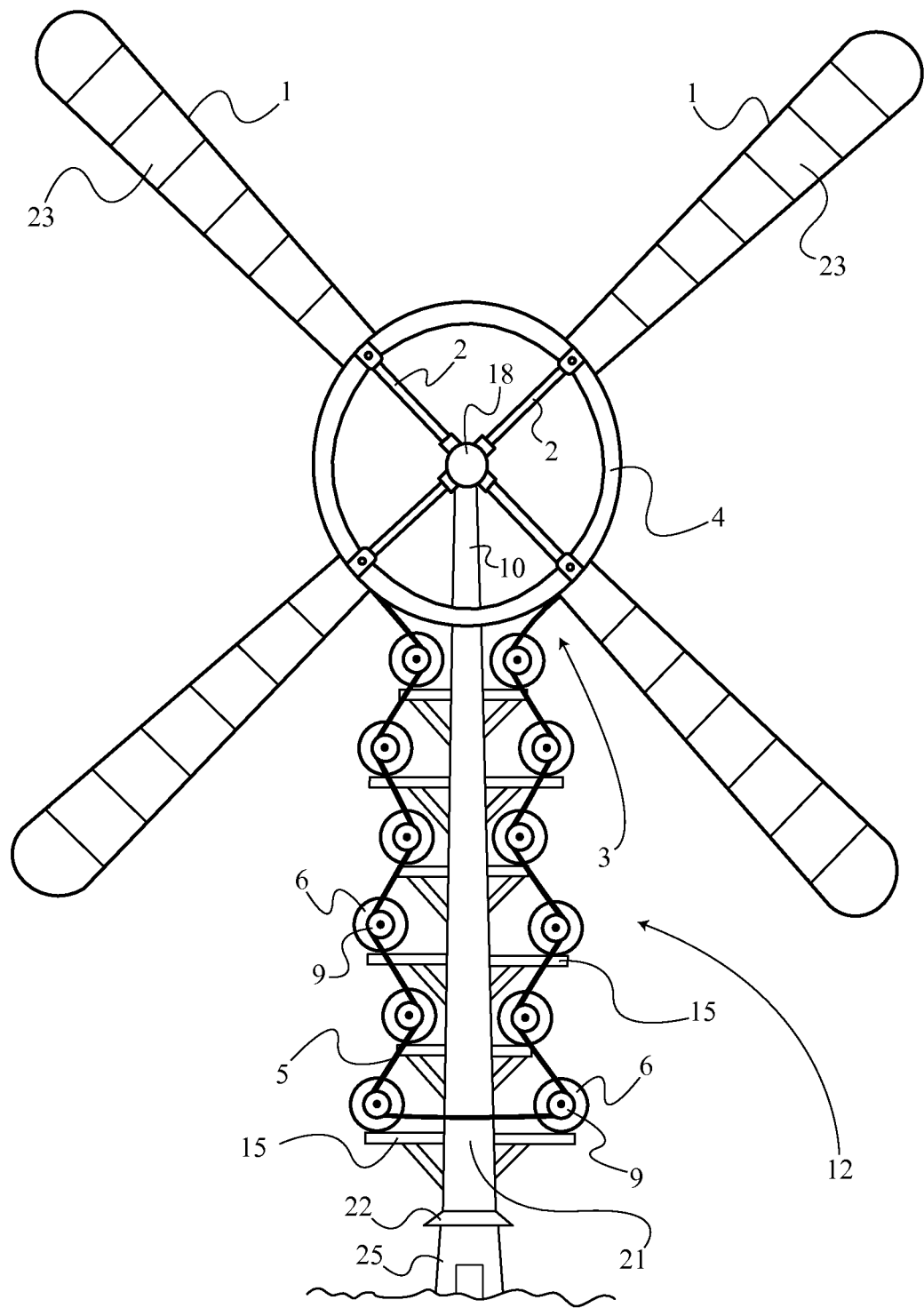
FIG. 9 is a front view of the present invention's second embodiment, where the present invention does not have a yaw rotational mechanism.

In an embodiment similar to the second embodiment, the present invention is designed to cater to a location that has wind consistently blowing in the one direction. The present invention in this embodiment, which is shown in FIG. 9, does not include a yaw rotation mechanism 16 or a wind alignment mechanism 20 because the plurality of wide blades 1 only have to face in one direction to capture the kinetic energy of the wind. The cage 14 in this embodiment is directly attached to the base structure 21.

The wide blade multiple generator wind turbine has a number of miscellaneous advantages. One advantage is that the present invention has an abundance of generators, which increase the durability of the entire system. For example, if a generator shows signs of degradation, then the load that generator was carrying can be transferred to the other generators so that the ability to control output power becomes more independent of the wind speed. Thus, the abundance of generators increases the durability of the present invention and reduces costly maintenance visits to the present invention. Another advantage of the present invention is the overall simplicity of the planetary gear system between the sun gear 4 and the planet gear 9 of each of the plurality of generators 6. The planetary gear system should be relatively cost effective to design, manufacture, and maintain. Another advantage is the present invention's ability to produce a large amount of power in a relatively small area. For example, the new solar farm being constructed on the Mojave Desert in Southern California will use 6,000 acres of land to generate 1,000 megawatts, which will power 800,000 homes. Provided enough wind, the present invention could generate 1,000 megawatts on 160 to 320 acres, based on one of the present invention per half acre to an acre. Another advantage of the present invention is that, unlike the conventional blades of the single generator wind turbine, each of the plurality of wide blades 1 has more of its mass relatively far from the center of rotation. The further the distance away from the center of rotation that the force is applied, the greater the amount of torque that will be generated. This large rotational moment of inertia also acts as a small energy storage to buffer against wind gusts. Another advantage is that the generator support system 12 allows the present invention to utilize any number of generators of one to five megawatts. The generator support system 12 provides manufactures with the flexibility to build the present invention with a plurality of generators 6 that is best suited to harness the available kinetic energy of the wind at a particular construction site. A last advantage is that the plurality of wide blades 1 rotates at a much slower angular velocity than the blades of a traditional wind turbine. The slower angular velocity of the plurality of wide blades 1 will prevent the present invention from harming birds and bats, which has increased public resistance to traditional wind turbines.

Although the invention has been explained in relation to its preferred embodiment, it is to be understood that many other possible modifications and variations can be made without departing from the spirit and scope of the invention as hereinafter claimed.

What is claimed is:

1. A wide blade multiple generator wind turbine comprises,
   a plurality of wide blades;
   a plurality of blade arms;
   a torque transferring mechanism;
   a plurality of generators;
   a support structure;
   a yaw rotation mechanism;
   a main shaft;
   a wind alignment mechanism;
   a base structure;
   a squirrel deflector;
   a plurality of solar energy capturing surfaces;
   a shroud;
   a tech room;
   said torque transferring mechanism comprises at least one sun gear;
   said plurality of generators each consists of a bracket, a coupling device, and a planet gear;
   said support structure consists of a hollow cylinder and a generator support system;
   said main shaft consists of a front stop and a back stop;
   said generator support system comprises at least one circular armature;
   said hollow cylinder being centrally positioned on said support structure;
   said generator support system being concentrically positioned around said hollow cylinder;
   each of said plurality of generators being attached to said generator support system by said bracket of each of said plurality of generators;
   said hollow cylinder being traversed by said main shaft;
   said torque transferring mechanism being engaged to said planet gear of each of said plurality generators;
   each of said plurality of generators being engaged to said planet gear with said coupling device;
   said plurality of generators being covered by said shroud;
   said shroud being attached to said generator support system;
   said support structure being rotatably attached atop said base structure with said yaw rotation mechanism;
   said squirrel deflector being concentrically connected along said base structure; and
   said tech room being positioned within said base structure.

2. The wide blade multiple generator wind turbine as claimed in claim 1 comprises,
   said front stop being positioned opposite said back stop on said main shaft;
   said plurality of wide blades being radially positioned around said main shaft adjacent to said front stop;
   each of said plurality of wide blades being attached to said front stop with said plurality of blade arms; and
   said torque transferring mechanism being concentrically attached around said main shaft.

3. The wide blade multiple generator wind turbine as claimed in claim 1 comprises,
   said plurality of solar energy capturing surfaces being located on said plurality of wide blades.

4. A wide blade multiple generator wind turbine comprises,
   a plurality of wide blades;
   a plurality of blade arms;
   a torque transferring mechanism;
   a plurality of generators;
   a support structure;
   a yaw rotation mechanism;
   a main shaft;
   a wind alignment mechanism;
   a base structure;
   a squirrel deflector;
   a plurality of solar energy capturing surfaces;
   a shroud;
   a tech room;
   said torque transferring mechanism comprises at least one sun gear and at least one chain;
   said plurality of generators each consists of a coupling device and a planet gear;
   said support structure consists of a hollow cylinder and a generator support system;
   said main shaft consists of a front stop and a back stop;

said generator support system comprises a cage and a plurality of platforms
said plurality of solar energy capturing surfaces being located on said plurality of wide blades
said squirrel deflector being concentrically connected along said base structure below said generator support system; and
said tech room being positioned within said base structure.

5. The wide blade multiple generator wind turbine as claimed in claim 4 comprises,
said front stop being positioned opposite said back stop on said main shaft;
said plurality of wide blades being radially positioned around said main shaft adjacent to said front stop;
each of said plurality of wide blades being attached to said front stop with said plurality of blade arms; and
said at least one sun gear being concentrically attached around said main shaft.

6. The wide blade multiple generator wind turbine as claimed in claim 4 comprises,
said hollow cylinder being centrally positioned atop said support structure;
said generator support system being positioned below said support structure;
said generator support system being concentrically positioned around said base structure;
said generator support system being rotatably attached to said base structure with said yaw rotation mechanism; and
each of said plurality of generators being attached to said generator support system.

7. The wide blade multiple generator wind turbine as claimed in claim 4 comprises,
said hollow cylinder being traversed by said main shaft;
said chain being engaged to said sun gear and to said planet gear of each of said plurality of generators;
each of said plurality of generators being engaged to said planet gear with said coupling device;
said plurality of generators being covered by said shroud; and
said shroud being attached to said generator support system.

8. A wide blade multiple generator wind turbine comprises,
a plurality of wide blades;
a plurality of blade arms;
a torque transferring mechanism;
a plurality of generators;
a support structure;
a yaw rotation mechanism;
a main shaft;
a wind alignment mechanism;
a base structure;
a squirrel deflector;
a plurality of solar energy capturing surfaces;
a shroud;
a tech room;
said torque transferring mechanism comprises at least one sun gear;
said plurality of generators each consists of a bracket, a coupling device, and a planet gear;
said support structure consists of a hollow cylinder and a generator support system;
said main shaft consists of a front stop and a back stop;
said generator support system comprises at least one circular armature;
said front stop being positioned opposite said back stop on said main shaft;
said plurality of wide blades being radially positioned around said main shaft adjacent to said front stop;
each of said plurality of wide blades being attached to said front stop with said plurality of blade arms;
said torque transferring mechanism being concentrically attached around said main shaft;
said torque transferring mechanism being engaged to said planet gear of each of said plurality of generators; and
each of said plurality of generators being engaged to said planet gear with said coupling device.

9. The wide blade multiple generator wind turbine as claimed in claim 8 comprises,
said hollow cylinder being centrally positioned on said support structure;
said generator support system being concentrically positioned around said hollow cylinder;
each of said plurality of generators being attached to said generator support system by said bracket of each of said plurality of generators;
said hollow cylinder being traversed by said main shaft;
said plurality of generators being covered by said shroud; and
said shroud being attached to said generator support system.

10. The wide blade multiple generator wind turbine as claimed in claim 8 comprises,
said support structure being rotatably attached atop said base structure with said yaw rotation mechanism;
said squirrel deflector being concentrically connected along said base structure;
said tech room being positioned within said base structure; and
said plurality of solar energy capturing surfaces being located on said plurality of wide blades.

* * * * *